April 20, 1965  F. M. McBURNEY ETAL  3,179,464
RETRACTABLE COVER FOR TRUCK BODIES
Filed June 1, 1962
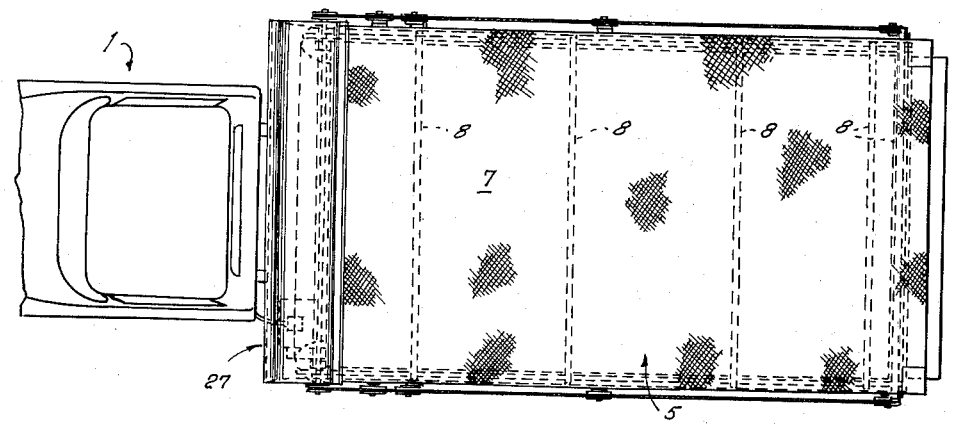
Fig. 1
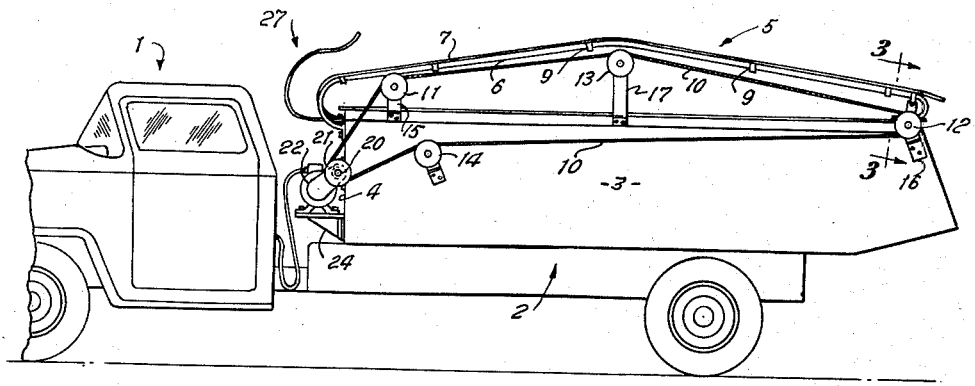
Fig. 2
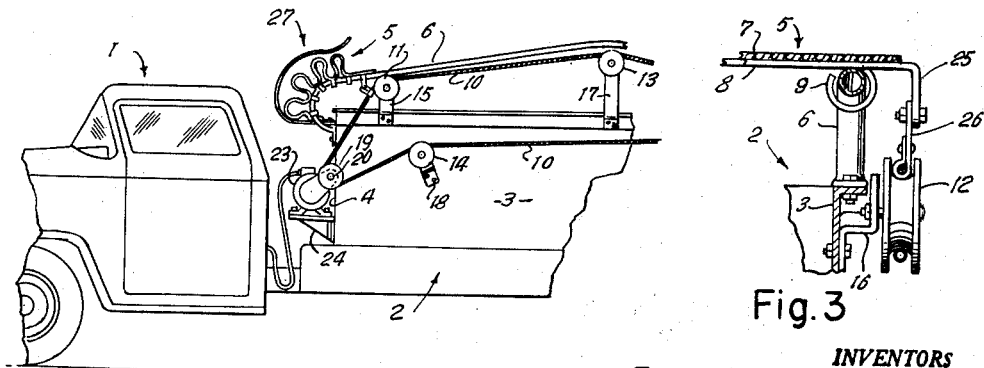
Fig. 4         Fig. 3
INVENTORS
Faye M. McBurney
BY Elmer E. Moore
ATTORNEY

United States Patent Office 3,179,464
Patented Apr. 20, 1965

3,179,464
RETRACTABLE COVER FOR TRUCK BODIES
Faye M. McBurney, P.O. Box 217, Cresson, Tex., and Elmer E. Moore, 424 Athenia Lane, Fort Worth, Tex.
Filed June 1, 1962, Ser. No. 199,527
2 Claims. (Cl. 296—100)

This invention relates to retractable covers for trucks and trailers used in hauling gravel, dirt, sand, grain, and other relatively fine aggregate materials, and it has particular reference to a flexible cover formed from fabric, plastic, rubber, or other suitable materials, and its principal object resides in the provision of a cover which can be readily extended over the truck to enclose the load thereon while in transit.

In the transportation of gravel, sand, and the like, with dump trucks, portions of the materials are often dislodged through vibration, or the wind, to the detriment and damage of other vehicles traveling in the vicinity of the truck. It is advantageous to protect grain in transit on trucks and trailers, both from being blown away by the wind, as the vehicle moves along the roadway, and from the elements. The invention is designed to provide a convenient and efficient means for quickly and easily covering the load, even while in transit, yet providing a cover which is not readily disturbed or removed by wind.

An object of the invention is that of providing a cover for grain, gravel, and similar materials in transit which is capable of being operated from retracted to extended positions, and vice versa, by the vehicle operator without leaving the cab, and providing automatic means for actuating the same.

Broadly, the invention contemplates the provision of a cover or canopy for trucks, and similar vehicles, carrying any character of commodity requiring protection from the weather while in transit, and for preventing displacement of portions of the load when it consists of relatively small aggregate materials.

While the foregoing objects are paramount, other and lesser objects will become apparent, as the description proceeds, when taken in connection with the appended drawings wherein:

FIGURE 1 is a top plan view of a dump truck having applied thereto a fabric cover embodying the invention, showing the cover in its extended position.

FIGURE 2 is a side elevational view thereof.

FIGURE 3 is a fragmentary sectional elevational view on an enlarged scale taken on the line 3—3 of FIGURE 2, and FIGURE 4 is a fragmentary side elevational view, similar to FIGURE 2, showing the cover in its retracted position.

Referring to the drawing, the numeral 1 designates generally a dump truck having a bed, indicated generally by the numeral 2, the bed 2 having parallel side panels 3 and a front end panel 4. The numeral 5 designates generally a fabric cover which is applied to the bed 2 as hereinafter described.

As shown in FIGURES 2 and 3, a pair of tubular guide rails 6, which are arranged longitudinally of the bed 2, are rigidly connected at their ends to upper portions of the front panel 4, adjacent opposite sides thereof, and to upper portions of the respective side panels 3 rearwardly thereof.

The tubular guide rails 6 extend beyond opposite ends of the bed 2 and are bowed intermediate their ends whereby they are inclined upwardly in the direction of their middle portions, and have their end portions bent substantially 180 degrees and extending downwardly and longitudinally inwardly for attachment thereof to the front panel 4 and the respective side panels 3 of the bed 2.

The fabric cover 5 includes a sheet of suitable fabric material 7 which in its extended position, as shown in FIGURE 1, is stretched across the bed 2 of the truck 1 and extends substantially its entire length. The fabric material 7 has a plurality of transverse ribs or stays 8 secured to its under side at spaced intervals relative to its length. The transverse ribs or stays 8, which comprise elongated metal strips, are substantially coextensive with the width of the fabric material 7.

The transverse ribs or stays 8 have downwardly turned, hook shaped end portions 9, characterized by their inherent spring tension, which partially encircle the corresponding tubular guide rails 6 for sliding engagement therewith whereby the fabric material 7 is slidably supported at spaced intervals relative to its length on the tubular guide rails 6 for sliding movement from a retracted position, in which the fabric material 7 is folded compactly adjacent the forward end of the truck bed 2, as shown in FIGURE 4, to an extended position in which it extends substantially the entire length thereof, as shown in FIGURES 1 and 2.

As shown best in FIGURE 2, a pair of endless cables or drive belts 10 are strung between guide pulleys 11, 12, 13, 14, which are supported on brackets 15, 16, 17, 18, mounted exteriorly of the side panels 3 on opposite sides of the truck bed 2, as hereinafter described, and are driven by drive pulleys 19 connected to opposite ends of a drive shaft 20 which is positioned forwardly of the truck bed 2 and extends transversely thereof.

The drive shaft 20 is journaled in a bracket 21 mounted on the front panel 4, and is connected by drive means including a belt 22 to a motor 23 which is supported on a bracket 24 mounted on the front panel 4.

The guide pulleys 11, 12 and 13 are positioned above the side panels 3, forwardly and rearwardly thereof and intermediate its ends, respectively, the guide pulleys 13 being positioned at a higher elevation than the guide pulleys 11 and 12, while the guide pulleys 14 are positioned forwardly of the side panels 3, at a lower elevation than the guide pulleys 11 and 12, between the rearward guide pulleys 12 and the drive pulleys 19.

The portions of the endless cables or drive belts 10 which are strung between the uppermost guide pulleys 11, 12, 13 are arranged substantially parallel to corresponding portions of the tubular guide rails 6, laterally thereof and in close proximity thereto.

As shown in FIGURES 2 and 3, the rearmost transverse rib or stay 8, which is longer than the others and extends beyond opposite ends thereof, also extends laterally outwardly beyond the tubular guide rails 6 and has downwardly turned end portions 25 which are pivotally connected to clamping elements 26 whereby the rearmost transverse rib or stay 8 is secured at its ends to the endless cables or drive belts 10.

The portions of the endless cables or drive belts 10 which are strung between the uppermost guide pulleys 11, 12, 13, parallel to corresponding portions of the tubular guide rails 6, are movable together in the same direction toward opposite ends of the side panels 3 in response to the action of the motor 23 whereby the fabric material 7 is movable selectively in either direction between its retracted and extended positions as described.

A shaped, substantially rectangular metal shield, designated generally by the numeral 27, which advantageously may be formed of boiler plate, or the like, having a length corresponding substantially to the width of the truck bed 2, has one of its side edges rigidly secured to an upper portion of the front panel 4, between the adjacent end portions of the tubular guide rails 6, and extends forwardly below the fabric material 7 in its folded, retracted position, as shown in FIGURE 4, and then upwardly and rearwardly over it, whereby the fabric material 7 is protected against falling material during loading of the truck 1.

The invention may be modified in various ways without departing from the spirit and scope thereof.

What is claimed is:

1. A retractable cover for truck bodies having front and side panels, the combination comprising, a rail arranged along and above each side panel and secured at one end to said front panel and at their opposite ends to the top rear ends of said side panels, the said rails being arched upwardly intermediate their ends and having their forward ends extending beyond and turned downwardly and inwardly toward said front panel, a fabric cover extending throughout the length of the said body and having spaced transverse stays therebeneath, each slidably attached at each end to said rails, a cable arranged over a plurality of pulleys mounted on each of said side panels and having its ends connected to the opposing ends of the rearmost of said stays, means comprising a motor mounted on said front panel for operating said cable whereby to retract and extend said cover, and a shield mounted transversely of said front panel and curved upwardly and rearwardly over said front panel for enclosing said cover in retracted position.

2. A retractable cover for truck bodies having a front panel and side panels, comprising, in combination, a tubular rail arranged along and above each side panel and having its forward end extending beyond and curved downwardly and inwardly and secured to said front panel, each of said rails being arched upwardly intermediate its ends, a fabric cover slidably supported in extended position along each longitudinal edge on said rails, and having a series of spaced stays attached thereto and slidably connected at their opposite ends to said rails, an endless cable arranged over a series of pulleys on each side panel and connected to the opposing ends of the rearmost of said stays, power means mounted on said front panel for operating said cable whereby to retract and extend said cover longitudinally of said body, and a shield attached to said front panel and extending outwardly and upwardly over and enclosing the curved forward ends of said rails and extending over said cover in retracted position.

References Cited by the Examiner
UNITED STATES PATENTS

| | | | |
|---|---|---|---|
| 1,263,759 | 4/18 | Hanaway | 296—105 |
| 2,406,737 | 9/46 | Bramble | 296—105 |
| 2,610,086 | 9/52 | Shield | 296—105 |
| 2,997,967 | 8/61 | Malapert | 296—100 |
| 3,041,104 | 6/62 | Richard | 296—100 |

A. HARRY LEVY, *Primary Examiner.*
PHILIP ARNOLD, *Examiner.*